Feb. 25, 1941. F. M. KENNEDY 2,233,055
AUTOMOBILE PARKING DEVICE
Filed May 4, 1939 2 Sheets-Sheet 1

INVENTOR.
Frank M. Kennedy
BY
James Harrison Bowen
ATTORNEY.

Feb. 25, 1941.  F. M. KENNEDY  2,233,055
AUTOMOBILE PARKING DEVICE
Filed May 4, 1939  2 Sheets-Sheet 2
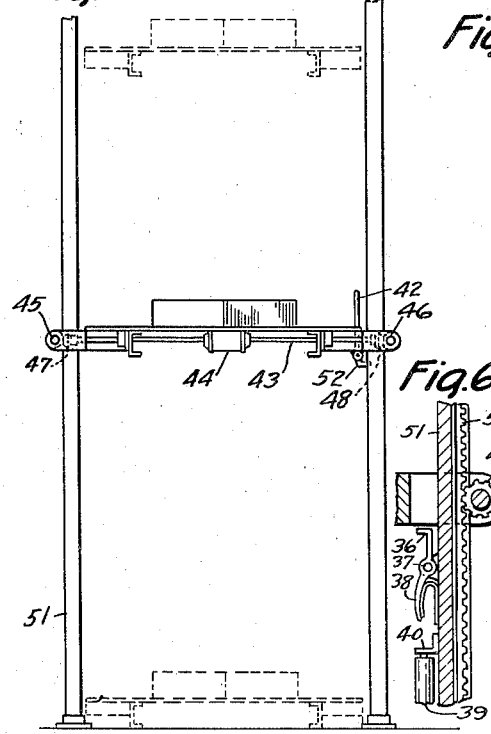
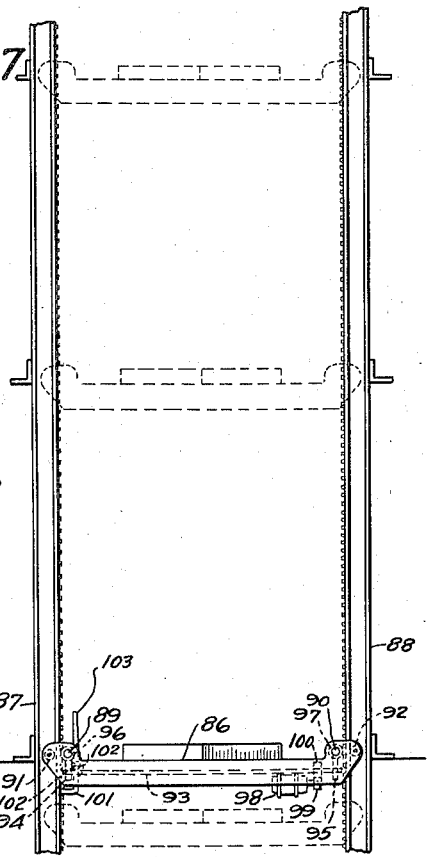
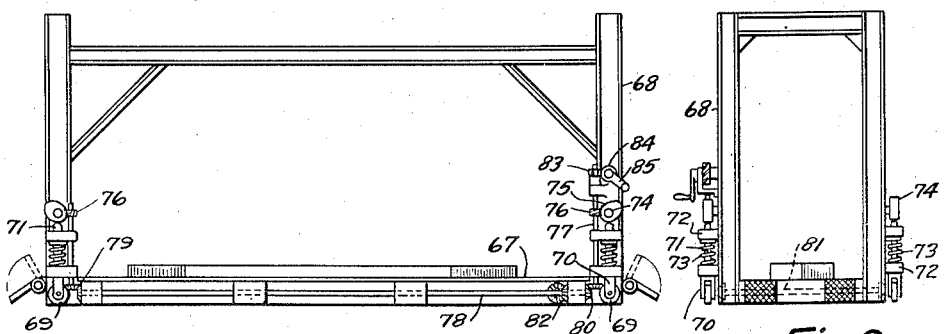
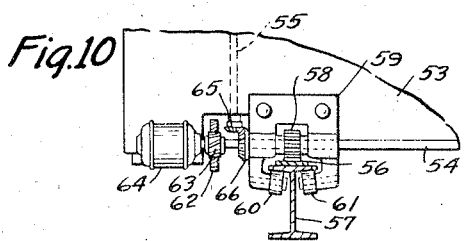
INVENTOR.
Frank M. Kennedy
BY
James Harrison Bowen
ATTORNEY.

Patented Feb. 25, 1941

2,233,055

UNITED STATES PATENT OFFICE 2,233,055

AUTOMOBILE PARKING DEVICE

Frank M. Kennedy, Tenafly, N. J.

Application May 4, 1939, Serial No. 271,704

1 Claim. (Cl. 254—89)

The purpose of this invention is to provide a relatively simple compact platform with a supporting structure for double parking motor-vehicles which may be used in garages or on the outside, and by which vehicles may be elevated or lowered.

The invention is a continuous rectangular shaped platform supported at the four corners by gears meshing with racks on posts in which the gears are mounted on the platform and adapted to be operated by a motor which may also be positioned on the platform to move the platform upward or downward. The device may be provided with suitable safety devices and a brake, and the platform is provided with a solid covering to prevent oil dropping on a machine below.

Many elevating devices have been provided for motor-vehicles, and other devices have been provided for elevating vehicles for greasing and the like, however the greasing devices do not provide space for another vehicle directly under the vehicle elevated, and any elevating device does not provide a relatively simple continuous platform upon which a vehicle may be driven and which is complete in itself in that it may readily be elevated or lowered to raise or lower the vehicle.

The object of this invention is, therefore, to provide an elevating platform for raising and lowering motor vehicles which, in itself, provides a complete operating unit.

Another object is to provide a parking device into which vehicles may be driven and elevated which when elevated provides space for another vehicle.

Another object is to provide a parking device for motor vehicles in which one may be parked directly above another which may readily be installed in a garage or used on the outside.

A further object is to provide an elevating platform with supporting posts in which a plurality of platforms may be used in the same supporting means.

And a still further object is to provide an elevating platform for parking motor vehicles one above the other which is of a simple and economical construction.

With these ends in view the invention embodies a continuous rectangular shaped platform with notches at the corners in which supporting posts are located, parallel shafts at the sides of the platform having gears corresponding with the post openings, racks positioned to mesh with the gears on the posts, driving means connecting the shafts, and a motor for operating one of the shafts. The posts may be provided with bumpers and a safety latch, and the ends of the platform may be provided with stops which may be lowered to provide ramps when moving vehicles on and off of the platform.

Other features and advantages of the invention will appear from the following description taken in connection with the drawings, wherein—

Figure 5 is a view showing an end elevation of the device showing an alternate design in which the motor is located below the platform.

Figure 6 is a detail showing one of the elevating gears in combination with the rack on one of the posts.

Figure 7 is a view showing another alternate design, in which the racks are on the insides of the posts, and the platform is adapted to pass below and also above the floor.

Figure 8 is a view showing another alternate design in which the platform is mounted in a frame, and the frame is adapted to be supported on wheels or casters so that it may be moved from one position to another.

Figure 9 is an end view of the frame shown in Figure 8.

Figure 10 is a detail showing a corner of the platform in the design shown in Figure 7.

Figure 1:
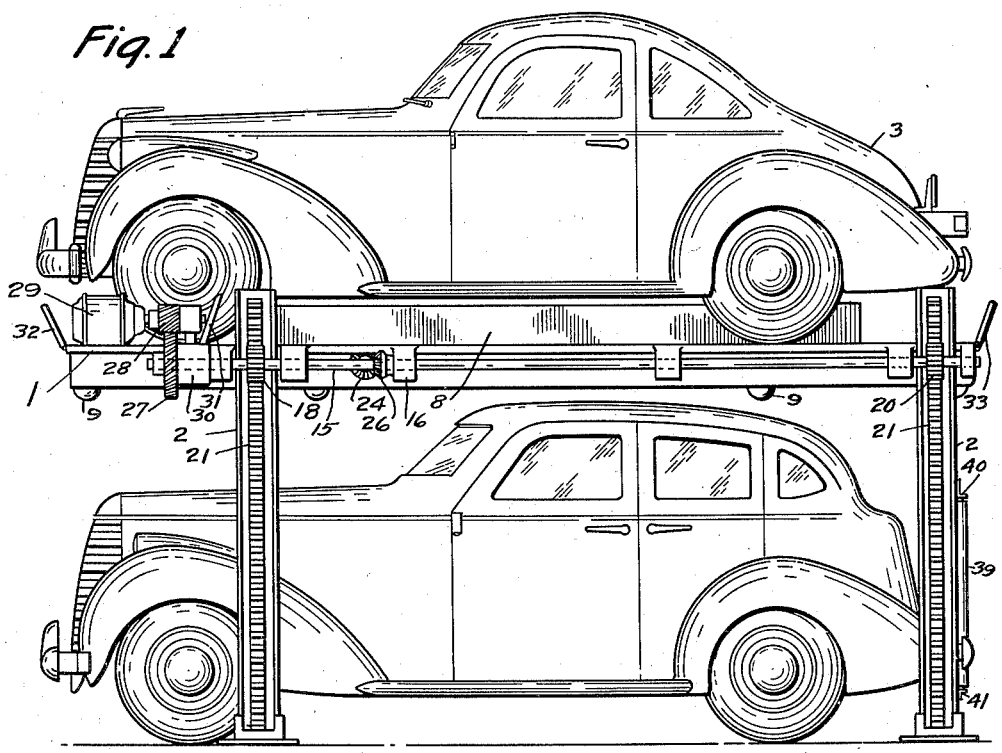
Figure 1 is a view showing a side elevation of the device in the preferred form.

In the drawings the device is shown as it may be made, wherein numeral 1 indicates the platform, numeral 2, the posts, and numeral 3, a vehicle on the platform.

The platform 1 is preferably made of a continuous plate with longitudinal supporting members 4 and 5 on the lower side, and these may be connected by cross members 6, and the upper surface may be provided with wheel guides 7 and 8 to insure the vehicle being located in the correct position upon the platform. It will be understood, however, that the platform may be of any other shape or design and may be constructed in any manner.

The lower surfaces of the supporting members may be provided with bumpers 9 which may be of rubber or other material for holding the surface above the floor, thereby preventing dirt and grease adhering thereto. This eliminates the possibility of dirt and grease dropping upon a vehicle positioned under the platform.

The corners of the platform are provided with notches 10, 11, 12 and 13, and the posts 2 are positioned to correspond with these notches so that the platform may travel upward and downward between the posts, and on the sides of the platform are parallel shafts 14 and 15 supported in bearings 16 extending outward from the platform, and pinions 17, 18, 19 and 20 are mounted upon the shafts and positioned to correspond with the notches so that they will mesh with gear racks 21 on the outer surfaces of the posts. The platform may also be provided with a transverse shaft 22 having bevel gears 23 and 24 adjacent the ends which mesh with bevel gears 25 and 26 on the shafts 14 and 15, and the shaft 15 is provided with a gear 27 which meshes with a pinion 28 on a shaft of a motor 29, and it will be noted that, as the motor is started, it will rotate the shaft 15, and this will rotate the shaft 14 through the transverse shaft 22 so that all of the pinions meshing with the racks on the posts will operate in unison. It is preferred to use herringbone gears for the gears 27 and 28, as shown in Figure 1, so that the gear 27 cannot turn the gear 28, thereby providing braking means through the motor.

In Figure 1 a clutch 30 is illustrated on the shaft 15 which may form a brake or which may be used for starting. This clutch may be of any type or design and may be arranged in any manner. In the design shown it is provided with an operating lever 31 extending upward at the side of the platform, however, this may be controlled from a remote point or by any means.

Figure 4:
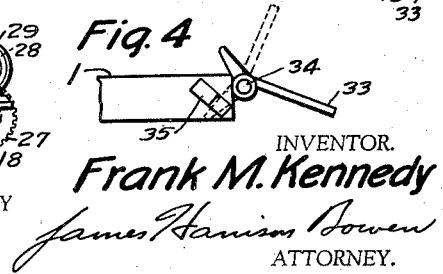
Figure 4 is a detail showing a section at one end of the platform.

The ends of the platform 1 are provided with stops 32 and 33 which may be hinged to the ends of the platform as shown at the point 34 in Figure 4, and these may be provided with extensions at the sides which will extend downward when the stops are raised, and these may be held in the downward position with the stops extending upward, as indicated in the dotted lines in Figure 4, by latches 35, and, when it is desired to remove a vehicle from the platform, the latches may be pressed inward to release the stops, permitting them to drop downward to the position indicated by the full lines in Figure 4. It will be understood, however, that these members may be attached to the ends of the platform in any other manner, or by any means, and any means may be provided for holding them in the upright position.

The frame may also be provided with a safety latch 36 hinged at the point 37 and provided with a handle 38, and the upper end is positioned to extend outward under the platform when the handle 38 is moved inward against the post, to positively hold the platform, preventing its moving downward when a motor vehicle is positioned thereon and the platform is elevated. It will be understood that any other type of latch or holding means may be provided, and these may also be provided at any other point or points as may be desired.

Figure 2:
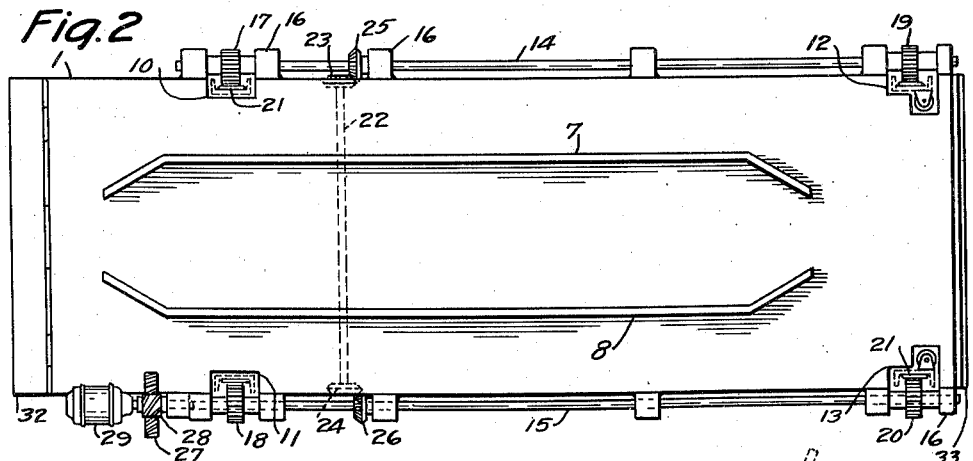
Figure 2 is a plan view of the platform with the posts indicated in dotted lines.
Figure 3:
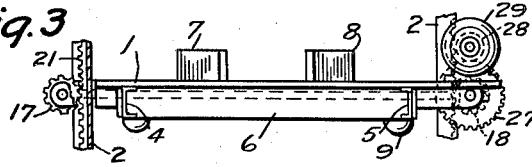
Figure 3 is a view showing an end elevation of the platform with parts broken away.

The inner surfaces of the posts may be provided with rubber rollers 39 forming bumpers, with the ends held between clips 40 and 41, and these may be in the form of rollers, as shown, or any suitable resilient members may be provided for protecting the fenders of the vehicle from the inner surfaces of the posts, and these may be located on as many posts as may be desired. The bumpers and also the latch 36 may be positioned to pass through extensions in the recesses in the sides of the platform, as shown in Figures 2 and 6, or arranged in any manner.

In the design shown in Figure 5, the platform, which is indicated by the numeral 42, is provided with a transverse shaft 43 having a motor 44 thereon, and the ends of the shaft drive the two parallel shafts 45 and 46 at the sides through the bevel gears 47 and 48, and the shafts 45 and 46 are provided with gears 49 that mesh with racks 50 on the posts indicated by the numeral 51 which are similar to the posts shown in Figure 1. In this design, the motor may be started, and this will raise and lower the platform, and it will be understood that the platform may be provided with a safety latch, as indicated by the numeral 52, which may be of any type or design.

In Figure 7 another alternate design is illustrated in which a platform 53 similar to the platform 1 is provided with parallel shafts 54 at the sides with a transverse shaft 55, and in this design the gear racks 56 are mounted on the inner surfaces of the posts 57, and the shafts 54 are provided with pinions 58 that mesh with the 20 gears, the shafts being held in bearings 59, with rollers 60 and 61 bearing against the inner surfaces of flanges at the ends of the posts, thereby assuring meshing of the pinions with the racks. In the design shown in Figure 10, the shaft 54 is provided with a gear 62 similar to the gear 27, and this is operated by a gear 63 on a motor 64, the transverse shaft 55 being connected to the shaft 54 through bevel gears 65 and 66.

In the design shown in Figures 8 and 9, a platform 67, similar to the platform 1, is mounted between posts 68 forming a frame, with the posts tied together by structural members at both the top and bottom, and, in this design, the platform may be elevated similar to the platform 53 in the design shown in Figure 7, and, with a vehicle on the platform, the entire frame may be moved from one position to another. In this design, the frame is provided with rollers or casters 69 mounted in yokes 70, with upwardly extending pins 71 held in bearings 72 and resiliently held upward by springs 73, and the upper ends of the pins 71 engage cams 74 having gear segments 75 formed in their inner surfaces meshing with gears 76 on vertical shafts 77. The vertical shafts at the sides are connected by longitudinal shafts 78 through bevel gears 79 and 80, and the shafts at the opposite sides are connected by a transverse shaft 81 through bevel gears 82. One of the shafts 77, as shown in Figure 8, is provided with a gear 83 meshing with a gear 84 on a crank 85, and it will be noted that, as the crank is rotated, it will operate the gears 76 which will turn the cams 74 over, thereby moving the pins 71 downward and lowering the rollers 69, thereby elevating the entire frame, making it portable and supported on the rollers so that it may readily be moved from one position to another.

In the design shown in Figure 7, an alternate arrangement of the motor is illustrated in which a platform 86 similar to the platform 1 is suspended between posts 87 and 88, with gears 89 and 90 similar to the gear 58 meshing with notches forming gear racks in the inner surfaces of the posts 87 and 88, and these are held in position by rollers 91 and 92 similar to the rollers 60 and 61, and the platform is provided with a transverse shaft, as indicated by the dotted lines 93 with herringbone gears 94 and 95 on the ends of the shaft 93 meshing with corresponding gears on the shafts 96 and 97 upon which the gears 88 and 89 are mounted, and the shaft 93 is driven from a motor 98 through gears 99 and 100, although it will be understood that any suitable driving means may be provided and the motor and gears may be arranged as illustrated or may be arranged as shown in Figure 10 or in the designs illustrated in any of the other figures.

In this design the platform is also provided with a safety latch 101 pivotally mounted at the point 102, and this latch is provided with an upwardly extending handle 103 which may be drawn outward to move the latch into engagement with the gear teeth of the rack in the post 87 when it is desired to lock and hold the platform at any point, and the handle may also be pressed inward to release the latch when desired. It will be understood that a latch of any other type or design may be used, and this may be arranged in any manner or located at any other point or points.

It will be understood that other changes may be made in the construction without departing from the spirit of the invention. One of which changes may be in the use of a platform of any other type or design, another may be in the use of other means for supporting the platform, another may be in the use of other means for operating the gears to raise and lower the platform, another may be in the use of a safety lock or latch of any other type, and still another may be in the use of other means for lowering the platform by gravity or any means.

The construction will be readily understood from the foregoing description. In use the device may be provided as shown and described, and it will be noted that it may be built into a garage or parking block and may be provided for commercial or domestic use, and a plurality of similar devices may be installed in combination, and also it may be constructed with any number of cars in a column and the cars may be elevated above the floor or lowered below the floor as may be desired.

It is preferred to use a platform formed of a continuous sheet of material preventing any possibility of leakage of oil, dirt, or the like dropping from the bottom of a car upon another car below, and this platform is suitably supported and provided with guide rails to locate the car in position thereon, and each platform contains an individual motor with driving means connecting the motor to gears located at the posts and positioned to mesh with racks or gear teeth on or in the posts, and, although it is desirable to drive the gears in one direction to elevate the platform and in another direction to lower the platform, it will be understood that safety latches and other control devices may be provided particularly for lowering the platform by gravity or against the operation of the motor. The device may also be provided with suitable brakes and clutches to control the speed of the motor when lowering the platform or to directly control the downward movement of the platform.

It will also be understood that, although the platform is illustrated as being supported at four corners on four posts, any number of posts may be used particularly for heavy trucks or other vehicles, and, although spur gears and gear racks are illustrated as the elevating means, any suitable elevating devices may be used, and each platform may be operated by an independent motor or driver or operated by any means or from any point or points.

Having thus fully described the invention, what I claim as new and desire to secure by Letters Patent, is:

A double parking unit for motor vehicles and the like, characterized by a horizontal surface for one vehicle, a horizontal movable platform for another vehicle superimposed above the former surface, and means elevating and lowering said platform; said platform being continuous to prevent drip from a vehicle thereon upon a vehicle on the said horizontal therebelow, and said elevating and lowering means comprising four posts positioned at the corners of the platform, gear racks on the posts, pinions on the platform meshing with the said racks, parallel shafts rotatably mounted at the edges of the platform on which the pinions are mounted, a motor positioned on the upper surface of the platform providing unobstructed clearance under the platform adapted to drive the parallel shafts through gears with angularly positioned teeth to provide a brake, resilient rollers forming bumpers on the innersurfaces of some of the posts for preventing scraping the sides of a motor vehicle thereon, and guides on the upper surface of the platform for locating a motor vehicle thereon; said unit further characterized in that the posts are positioned in recesses in the edges of the platform and the racks are located on the outer surfaces of the posts thereby directing the thrust of the pinions inward to prevent spreading of the posts.

FRANK M. KENNEDY.